July 10, 1962
A. H. HANSON
3,043,338
DOUBLE ACTION HYDRAULIC CYLINDER
Filed June 8, 1961
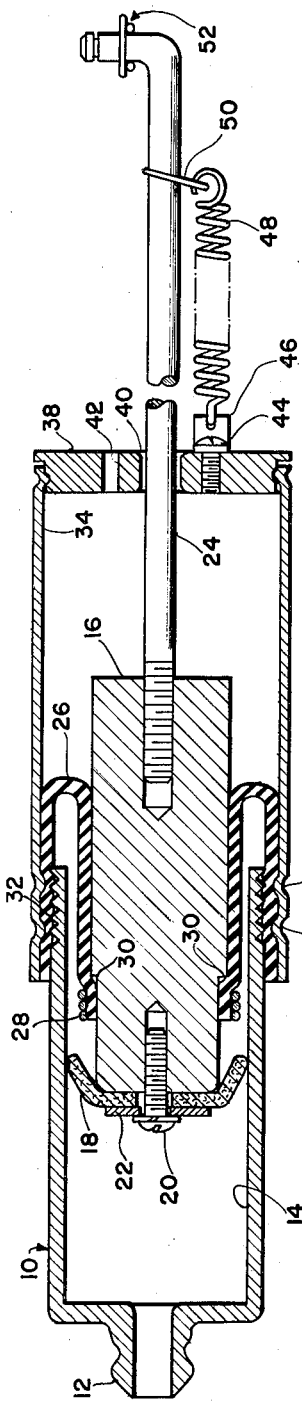
FIG.1
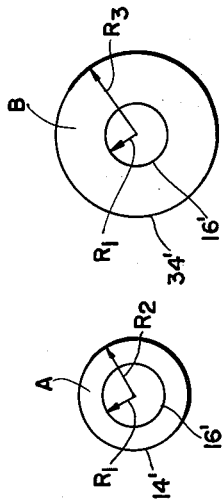
FIG.3
FIG.4
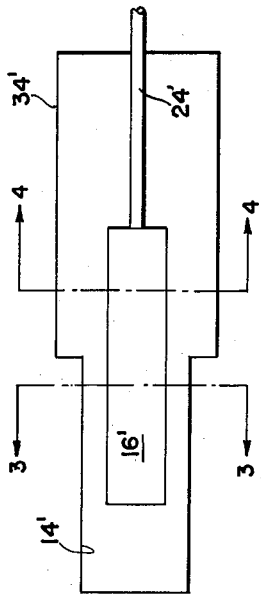
FIG.2
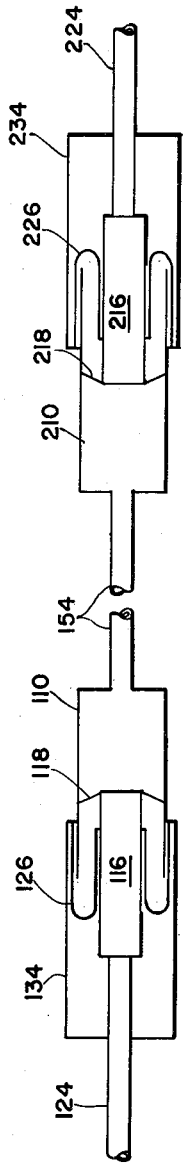
FIG.5
*INVENTOR.*
ALFRED H. HANSON
BY
*Adams, Forward & McLean*
ATTORNEYS

United States Patent Office 3,043,338
Patented July 10, 1962

3,043,338
DOUBLE ACTION HYDRAULIC CYLINDER
Alfred H. Hanson, Garrison, N.Y., assignor to Crowell Designs, Inc., Point Pleasant, N.J., a corporation of New Jersey
Filed June 8, 1961, Ser. No. 118,488
9 Claims. (Cl. 137—784)

My invention relates to a double action hermetically sealed hydraulic cylinder.

While my device is useful in many applications, it is particularly useful in hydraulic systems for controlling motions remotely. The controlling of motions remotely can be accomplished by electrical, mechanical or fluid means. In some installations, however, electrical means are not practical or not permitted. Also, in some installations mechanical linkages are impracticable, cumbersome or too costly. In particular, mechanical devices for remotely controlling the various moving parts encountered in marine operations, such as engine throttles, clutches and steering gear, while known and employed, have undesirable limitations. Most mechanical devices require a complex assortment of rods, levers, gears, racks, cables and worms, which when compounded by the modern trend toward multiple operating stations, become extremely bulky and cumbersome in comparison to the size of the boat. Even the most generally accepted type of mechanical device employed today, the sheathed cable, is limited as to length, ability to handle loads, curvature, lost motion and friction.

Previously suggested fluid control devices include precision machined cylinder and piston assemblies, cylinder and cup washer designs and bellows arrangements but all these devices have marked disadvantages. Precision machined cylinder and piston assemblies, in addition to being extremely expensive, do not maintain complete leakage free operation thereby permitting the inevitable introduction of atmosphere into the fluid. The presence of air within the hydraulic system produces an undesirable "spongy" or elastic feel in the control which is contrary to the desired solid, direct action feel required in the control. Furthermore, when sufficient air supplants fluid, the control also develops lost motion. While the cylinder may be accurately finished and the piston sealed in the cylinder so as to preclude fluid leakage on a pressure stroke it is physically impossible to seal against air leakage on a vacuum stroke. It has been suggested to use such cylinder for double action by employing a return tube design so that fluid may be retained on either side of the piston. This scheme however, necessitates a piston rod packing gland or form of rubber cup closure which is prone to air leakage. Packing glands are generally unsuited for manual reciprocating action due to the freezing action and erratic action developed. Attempts to employ rubber U cup closures arranged back to back result in undue friction due to lack of lubrication. Furthermore, such U cups have a tendency to freeze up on the shaft when allowed to remain for a period of time and are torn apart by subsequent shaft movement.

It has been suggested to employ a cylinder and cup washer design similar to the common automotive hydraulic brake system. Such piston cups are generally of oil resistant rubber compounds wherein a sealing is good provided pressure is maintained which forces the cups against the cylinder walls. These cups, however, are subject to freezing to the cylinder wall when left at rest. Moreover, these cups require the maintenance of positive pressure on one side in order to maintain the seal.

Bellows arrangements have been suggested which provide the necessary hermetic seal required in such systems but which also, due to their nature, employ large convoluted areas which are dimensionally unstable and which are prone to produce a spongy, elastic action. When employing an elastic bellows, the flat walls of the convolutions bulge or bow under the influence of pressure. While metallic bellows are more rigid, such devices are significantly affected by thermal expansion as evidenced by the use of such devices as thermostats.

Another hydraulic device is the known hydraulic unit using an inverted tube seal in which a straight sided tube is partially inverted or turned inside out so as to form a generally annular diaphragm having the inside of the tube sealed to a piston or solid ram and the outside sealed to the end of the cylinder. As the ram or piston is moved in the cylinder, the tube will fold upon itself providing a hermetic seal. These devices, however, are intended for single action wherein pneumatic or fluid pressure separates the reciprocating walls of the rubber tube. Such separation being an absolute necessity since the walls would otherwise adhere and stick to each other creating a frictional load. However, when a negative pressure is applied, the tube walls collapse upon themselves. Even where a fluid of high viscosity and lubricity is employed an undesirable amount of friction is developed and in addition thereto there is a loss of motion due to the collapsing effect of the tube.

It is an object of my invention to provide a hermetically sealed hydraulic cylinder using an inverted tube seal which is adapted for double action operation and which maintains constant and proper tube wall separation for either negative or positive pressure strokes.

It is also an object of my invention to provide a hermetically sealed double action hydraulic cylinder employing an inverted tube seal wherein undesirable characteristics such as friction, lost motion and sponginess are eliminated.

The apparatus of my invention comprises a hollow body in which the interior is composed of two interconnected chambers of differing cross-sectional dimensions. The end of the hollow body containing the smaller of the two chambers is connected to an hydraulic system. A piston or ram is positioned within the chambers of the hollow body and adapted to be axially moved therein. The ram is sufficiently smaller than the smaller of the two chambers so that a clearance space is maintained between the surface of the ram and the walls of the hollow body. Thus, the surface of the ram and the wall of the first chamber define the peripheral walls of a first clearance space and the surface of the ram and the wall of the second larger chamber define the peripheral walls of a second clearance space. A flexible sealing member, such as a cup washer, is attached to the end of the ram or piston travelling within the smaller chamber. This sealing member or cup washer has its periphery normally in sliding, sealing contact with the walls of the chamber. An annular, flexible diaphragm having a single annular fold, such as an inverted tube seal, is sealed at its outer edge to the hollow body intermediate the two chambers and is in sealed attachment at its inner edge to the ram or piston. The annular fold of the diaphragm travels within the second larger chamber. The annular diaphragm or inverted tube is of such dimension that it permits movement of the ram or piston within the hollow body.

It can be seen in effect then that the sealing member and the annular diaphragm define two volumes, the first volume being within the first smaller chamber and extending from the sealing member to the end of the smaller chamber and the second volume being within the second larger chamber and extending between the end of the smaller chamber or the beginning of the larger chamber and the annular fold of the diaphragm. The sealing member or cup washer is movable under hydraulic pressure to admit fluid to the volumes between the sealing member and the annular diaphragm. The sealing member is also biased to return to its normal sealing position thereby preventing the flow of fluid from such volumes. The dimensions of the two chambers and the ram are proportioned such that when the ram is moved within the hollow body, thereby moving the sealing member and the fold of the diaphragm, the rate of change of the first volume described above is equal to the rate of change of the second volume described above. Thus, the total volume contained between the sealing member and the fold of the annular diaphragm is maintained constant.

In the hydraulic unit of my invention the annular diaphragm or inverted tube functions to provide a hermetic seal in the manner well known in the art. The sealing member or cup washer also functions in the conventional manner to permit only unidirectional fluid flow past the member. Thus, if a volume of an incompressible fluid is trapped between the diaphragm and sealing member the diaphragm will be prevented from collapsing upon the application of negative pressure to the hydraulic system. To prevent the diaphragm from bursting, however, the dimensions of the chambers and ram must be critically sized. As can readily be understood, when the ram is moved the sealing member will move at the same rate since it is directly attached to the ram, while the fold of the diaphragm will move at only one-half the rate at which the ram is moved since the diaphragm is folded back on itself. Therefore, as the ram is moved in one direction, the distance between the sealing member and the fold of the diaphragm will decrease and as the ram is moved in the other direction, the distance between the sealing member and the fold of the diaphragm will increase. Obviously then, if the cross-sectional area between the ram and the chambers of the hollow body is constant, the volume contained between the sealing member and the fold of the diaphragm will vary substantially as the ram is moved. Therefore, in accordance with my invention the interior of the hollow body is divided into two chambers of varying size and one edge of the diaphragm affixed to the hollow body between the two chambers with the fold of the diaphragm travelling in the second larger chamber. By establishing the proper relationship among the dimensions of the ram and the two chambers, the total volume contained between the circular sealing member and the diaphragm can be maintained constant. In effect then, the hydraulic unit of my invention operates in a manner such that the rate of change of the volume between the sealing member and the end of the first chamber is equal to the rate of change of the volume between the end of the second chamber and the fold of the diaphragm. Therefore, a fixed quantity of an incompressible fluid can be trapped which functions to prevent the diaphragm from collapsing and thus provide double action and yet does not burst the diaphragm since there is no change in the total volume.

Preferably, the apparatus of my invention comprises a hydraulic cylinder in communication with a hydraulic system at one end thereof and having a ram or piston disposed within the hydraulic cylinder for axial movement therein. The piston or ram has a generally cylindrical surface and major diameter sufficiently smaller than the diameter of the hydraulic cylinder so as to provide a clearance space between the ram or piston and the hydraulic cylinder. The term "generally cylindrical" is employed in the specification and claims to describe a piston or ram having a surface in the shape of one cylinder of constant diameter, a plurality of cylinders of varying diameter or irregular variations from a cylinder. The ram or piston is also of a longitudinal dimension at least equal to the length of the hydraulic cylinder so that it travels axially beyond the end of the cylinder remote from its connection to the hydraulic system to provide a surface against which the tube bears. Thus, the generally cylindrical surface of the ram or piston and the hydraulic cylinder define the peripheral walls of a first, generally annular, clearance space. The term "generally annular" is employed to describe the shape of the clearance spaces which can vary from the form of a true annulus due to the variations of the ram surface. The flexible sealing member or cup washer is circular in shape and is attached to the end of the ram disposed within the hydraulic cylinder and, again, the periphery of the washer is in sliding, sealing contact with the wall of the cylinder. The annular, flexible diaphragm or inverted tube is sealed at its outer peripheral edge to the end of the hydraulic cylinder remote from the end in communication with the hydraulic system, and the inner peripheral edge of the diaphragm is in sealed, coaxial attachment to the ram or piston intermediate the ends thereof. A hollow cylindrical casing of larger diameter than the hydraulic cylinder is positioned coaxially with the cylinder and extends from the end of the cylinder opposite to the end in communication with the hydraulic system. Thus, the casing member and the generally cylindrical surface of the ram or piston travelling beyond the hydraulic cylinder define the peripheral walls of a second, generally annular clearance space. The annular diaphragm or inverted tube is disposed such that its annular fold travels within the second generally annular clearance space between the casing and the ram or piston. The total volume enclosed between the circular sealing member and the fold of the annular diaphragm can then be described as including a first generally annular volume within the cylinder between the sealing member and the end of the cylinder to which the diaphragm is attached and a second generally annular volume within the casing between the end of the cylinder just mentioned and the fold of the annular diaphragm. The dimensions of the cylinder, the casing and the ram are proportioned to each other such that as the ram, together with the sealing member and the fold of the diaphragm, is moved within the cylinder and casing the rate of change of the first generally annular volume is equal to the rate of change of the second generally annular volume. Advantageously, the casing member can be adapted to slip about the end of the hydraulic cylinder in such a manner that the outer peripheral edge of the annular diaphragm is firmly and sealingly grasped between the casing member and the exterior of the hydraulic cylinder.

In the employment of the apparatus of my invention it is quite common for the operating station aboard a boat to be located a significant distance above the controls which are to be moved. In such an employment, the piezometric head of the hydraulic system exerts a continuous force on the ram or piston. Advantageously, the force exerted by the piezometric head can be offset by biasing the ram or piston toward the end of the cylinder in communication with the hydraulic system by any well known means, such as a spring.

To illustrate more completely my invention, reference is made to the attached drawing in which:

FIGURE 1 is a cross-sectional view of a preferred embodiment of my invention.

FIGURE 2 is a schematic illustration of a device similar to that shown in FIGURE 1.

FIGURE 3 is a cross-section taken along the line 3—3 of FIGURE 2.

FIGURE 4 is a cross-section taken along the line 4—4 of FIGURE 2.

FIGURE 5 is a schematic diagram illustrating two of the devices of my invention coupled for the control of motions remotely.

FIGURE 1 shows a hydraulic cylinder 10 having a nozzle 12 at one end thereof adapted for connection to a hydraulic system. The interior cylindrical wall of hydraulic cylinder 10 is indicated by reference numeral 14. Disposed coaxially within hydraulic cylinder 10 is generally cylindrical elongated ram 16. At the end of ram 16 proximate nozzle 12 a cup washer 18 is affixed to ram 16 by means of bolt 20 and washer 22. As shown in the drawing, bolt 20 is threadedly received by ram 16. At the other end of ram 16 operating rod 24 is coaxially attached thereto as by threads.

A flexible tube is formed into an inverted tube 26 by binding one end of tube 26 to the ram 16 by several turns of wire 28. The ram 16 is provided with an annular shoulder 30 immediately adjacent binding wire 28 so as to assist in the mechanical connection and also to assist in maintaining sealing contact between inverted tube 26 and ram 16. The other end of inverted tube 26 is held in sealing contact with the end of cylinder 10 by clamping the end of inverted tube 26 between the teeth or serrations 32 on the outer surface of hydraulic cylinder 10 and the annular indentations 36 in the surface of hollow cylindrical casing 34. Thus, in assembling the particular apparatus illustrated in FIGURE 1, one end of inverted tube 26 is folded over the open end of hydraulic cylinder 10 and hollow cylindrical casing 34 is placed about the open end of hydraulic cylinder 10, thereby clamping the end of inverted tube 26 between the annular indentations 36 and teeth 32 as explained above. In addition, the hollow casing 34 is at the same time coaxially mounted to the end of hydraulic cylinder 10.

As shown in the drawing, hollow casing 34 is provided with a circular closure member 38 at the end of casing 34 remote from its attachment to hydraulic cylinder 10. The closure member 38 is provided with a central opening 40 of sufficient size to permit the free passage of operating rod 24. The closure member 38 is also provided with a port 42. Closure member 38 functions to maintain the shape of hollow casing 34, provide guide means for operating rod 24 and also preclude the excessive introduction of foreign bodies to the interior of casing 34. Port 42 connects the interior of casing 34 wtih the atmosphere thereby preventing any build-up of pressure or vacuum within casing 34 as ram 16 is moved.

Bolt 44 is employed to attach clasp 46 to the exterior surface of closure member 38. A coil spring 48 is connected at one end thereof to clasp 46 and at the other end thereof to friction tab 50 positioned about operating rod 24. At the end of operating rod 24 remote from ram 16 is shown a snap ring and washer 52 employed to connect the operating rod 24 with a separate mechanism.

In operation, an incompressible fluid, such as water and preferably water with an anti-freeze additive such as ethylene glycol, is charged to hydraulic cylinder 10 through nozzle 12. As fluid is added to the hydraulic cylinder the periphery of cup washer 18 is distended permitting the passage of fluid into the volume defined by inverted tube 26, interior wall 14 of hydraulic cylinder 10 and the surface of cylindrical ram 16. After the initial charging of fluid to the cylinder, the pressure on both sides of cup washer 18 equalizes permitting the periphery of cup washer 18 to return to its normal position which is in sealing contact with interior wall 14 as shown in FIGURE 1. As will readily be understood a quantity of incompressible fluid is now trapped between the fold of inverted tube 26 and cup washer 18. It should be noted that upon initial charging of the area the normal air content is bled off by loosening cup washer screw 20. Tightening of the screw 20 re-establishes the seal. It can also be seen that when a negative pressure is applied to hydraulic cylinder 10 through nozzle 12, such negative pressure will operate to maintain the periphery of cup washer 18 in sealing contact with interior wall 14 thereby preventing the escape of any of the previously trapped fluid. It is the presence of the trapped fluid which prevents the collapse of the inverted tube 26 in the operation of a device embodying my invention.

The ram 16 has been illustrated in FIGURE 1 at a point midway within its length of travel so as to facilitate illustration. Also, the size of various other elements illustrated in FIGURE 1 have been exaggerated to some extent in order to facilitate illustration.

As can readily be seen when ram 16 is moved within hydraulic cylinder 10 and casing 34, the cup washer 18 will be displaced at twice the rate at which the fold in inverted tube 26 is displaced. Thus, if ram 16, as shown in FIGURE 1, is moved to the left of FIGURE 1 the linear distance between cup washer 18 and the fold in inverted tube 26 will increase. Conversely, when ram 16 is moved to the right, as shown in FIGURE 1, the linear distance between cup washer 18 and the fold in inverted tube 26 will decrease. Thus, if the volume enclosed between cup washer 18 and the fold of inverted tube 26 is of constant annular cross-section, the inverted tube 26 will burst as the ram 16 is moved to the right and inverted tube 26 will collapse as the ram 16 is moved to the left, since a fixed quantity of an incompressible fluid is trapped between cup washer 18 and inverted tube 26. In accordance with my invention the volume defined between cup washer 18 and inverted tube 26 is maintained constant as ram 16 is moved.

To illustrated this more readily reference is made to FIGURES 2, 3 and 4. FIGURE 2 is a schematic representation of the device illustrated in FIGURE 1 showing interior wall 14', ram 16', operating rod 24' and the interior of hollow cylindrical casing 34'. As can be seen in FIGURE 2, the diameter of casing 34' is larger than the diameter of interior wall 14'. By referring to FIGURE 3 and FIGURE 4 the relative sizes of interior wall 14' and casing 34' as compared to ram 16' is emphasized. Thus, for purposes of illustration it may be assumed that the ram 16 of FIGURE 1 has been moved completely to the left. Then, as ram 16 is moved to the right inverted tube 26 commences to fold into casing 34. As mentioned previously, the cup washer 18 moves at twice the rate at which the fold of inverted tube 26 moves. Therefore, in order to maintain a constant volume between cup washer 18 and the fold of inverted tube 26, the portion of the trapped volume between cup washer 18 and the open end of hydraulic cylinder 10 must vary at the same rate as the portion of the trapped volume between the open end of hydraulic cylinder 10 and the fold of inverted tube 26. In order to accomplish this it is necessary that the diameter of cylindrical casing 34 be proportionally larger than the diameter of interior wall 14. Referring again to FIGURES 3 and 4 it can readily be seen that the cross-sectional area between interior wall 14' and ram 16', marked A in FIGURE 3, is substantially smaller than the cross-sectional area between cylindrical casing 34' and ram 16', marked B in FIGURE 4. Thus, it will be understood that due to the relative rates of displacement of cup washer 18 and the fold of inverted tube 26 mentioned above it is essential that area A be equal to one-half area B, with but slight variation. To express this relationship in another manner employing the symbols shown in FIGURES 3 and 4 where $R_1$ is the radius of ram 16', $R_2$ is the radius of the interior wall 14′ and $R_3$ is the radius of hollow casing 34′:

$$R_3 = \sqrt{2R_2^2 - R_1^2}$$

It is with these relations that the particular dimensions of the members of an apparatus in accordance with my invention can readily be determined. I have found that the dimensions selected must be such that the variation from a constant volume during ram travel from one extreme position to the other extreme position must not be more than 3 percent.

While the explanation of the critical sizes required in the apparatus of my invention in which reference was had to FIGURES 2, 3 and 4 employed the dimensions of the ram 16′ and the casing 34′, it will be understood that in an actual embodiment of my invention the thickness of the particular inverted tube employed must also be taken into consideration. Further, the variation in the diameter of ram 16 occurring at shoulder 30 has not been considered inasmuch as such a variation does not affect the critical relationship of sizes explained above. For example, in the embodiment shown in FIGURE 1 when the shoulder 30 or the end of inverted tube 26 attached to ram 16 is moved to the right beyond the end of cylinder 10 the additional volume transferred from within the cylinder 10 to within the casing 34 is removed from within the cylinder 10 at the same rate it is added to within the casing 34. Thus, such variations in the diameter or effective diameter of the ram 16 do nothing more than add a constant to the previously established critical relationship of sizes. Similarly, if the variation in ram size were an increase rather than a decrease, the effect would be the same and need not be considered in establishing the critical relationship of sizes.

Referring now to FIGURE 5 one method of employing devices in accordance with my invention is shown. Thus, for example, a control device located at a remote operating station, not shown, can be connected to an operating rod 124 which in turn is connected to a ram 116. The ram 116 is provided with a cup washer 118 at one end thereof and an inverted tube 126 which is connected intermediate the ends of ram 116. Also shown is a hollow cylindrical casing 134 extending coaxially from a hydraulic cylinder 110. The outer end of inverted tube 126 is sealingly attached between hydraulic cylinder 110 and hollow casing 134. A fluid line interconnects the interior of hydraulic cylinder 110 with the interior of hydraulic cylinder 210. Similarly, hydraulic cylinder 210 is also provided with a ram 216, cup washer 218, inverted tube 226 and hollow casing 234. A second operating rod 224 is shown connected to ram 216. The other end of operating rod 224 is connected to a mechanical device which is to be moved. Thus, if the control mechanism is moved at the remote operating station, operating ram 124 is moved, for example, to the right in FIGURE 5. Due to the application of positive pressure on the hydraulic system communicated from hydraulic cylinder 110 through line 154 to hydraulic cylinder 210, the ram 216 along with operating rod 224 is moved to the right. Due to the relative sizes of the various members, as explained above, there will be no increase in total volume trapped between the fold of inverted tube 126 and cup washer 118, thereby preventing collapse of inverted tube 126, nor will there be any decrease in total volume trapped between cup washer 218 and inverted tube 226, thereby preventing the bursting of inverted tube 226. Also, when operating rod 124 is moved to the left there will be no variation in total volume trapped between the cup washers and inverted tubes thus permitting the application of a negative pressure to the hydraulic system without the resultant collapsing of the inverted tubes 126 and 226.

It can be seen then that an apparatus in accordance with my invention has the inherent advantage of being operable through any reasonable distance between control points and is not restricted by the warping or bending of the tube connecting the hydraulic cylinders. Thus, smooth, low friction movement is provided. Also, the inverted tube provides a hermetic seal thereby excluding the introduction of air to the system precluding loss of motion and the "spongy" feeling in the controls. In addition my invention provides for a system that is easily and inexpensively installed requiring nothing more than mounting the hydraulic units and stringing a connecting tube. Furthermore, due to the maintenance of a constant volume between the sealing member and the fold of the diaphragm there is no spring-like character to the apparatus of my invention and a control will stay where it is positioned. The moving parts of an apparatus embodying my invention due to the protection of critical areas from excessive contact with the atmosphere are not subject to destructive corrosion and, therefore, have an extremely long life. Moreover, the critical portions of the apparatus are not subject to frictional wear thereby eliminating lubrication problems and extending the life of the parts.

In marine installations the effective piston area must be sufficient to assure a return stroke thrust of about 15 to 20 pounds and yet must not be so great as to be influenced excessively by head pressure. Therefore, selection of a hydraulic cylinder having a diameter of about 1.5 inches provides a unit in which the piezometric head can be offset by a light spring tension of about 8 to 10 pounds. Under normal operating conditions the fluid pressure within the hydraulic cylinder would not exceed about 10 to 15 p.s.i. However, the materials selected for fabricating an apparatus in accordance with my invention must also be of sufficient strength to withstand transient loads of at least about 100 p.s.i. since it is quite possible to apply such pressures when rapidly accelerating or clutching against system inertia.

Positive pressure containment and development is produced by the inverted tube fold in the known and accepted manner. Maximum working pressure can be controlled by the thickness of the tube wall and tensile strength but primarily by the radius of the fold. Extremely high pressures necessitate a small radius and consequent hysteresis loss. Therefore, the optimum design for the tube varies with pressure requirements. Negative pressure control is a function of the cup washer and does not influence the inverted tube. The cup washer flanges are constantly biased or distended against the cylinder wall by light pressure normally needed to separate the walls of the inverted tube, e.g. ½ to 2 p.s.i. depending on the thickness and nature of the inverted tube.

While the preceding discussion has been directed mainly to marine installations, particularly small boats, it will be understood that an apparatus in accordance with my invention can readily be employed in any field requiring the control of motions remotely. Thus, my invention can easily be adapted for use in the automotive and aircraft industries as well as other fields such as the movement of camera booms and fire fighting turrets. In addition, the cylinder of my invention can be employed for any of the usual applications where hermetic sealing is advantageous such as direct action power cylinders, valve mechanisms, pumps, accumulators and thrust applications such as presses, shears, jacks and lifts. This wide adaptability is due mainly to the flexibility of design unrestricted by area, stroke and pressure range.

The materials which can be employed in fabricating an apparatus in accordance with my invention include those well known in the art and commonly employed for such functions. Thus, the circular sealing member or cup washer can be a commercially available type composed of a material such as leather. Both the hydraulic cylinder and the hollow casing can be fabricated from any material supplying sufficient strength and rapidity such as a metal and certain plastics. The ram or piston can also be made from metal or plastic. The fluid employed in the hydraulic system can be any one of the incompressible fluids commonly employed in hydraulic systems. Thus, it can be a hydrocarbon fluid or water and preferably is water with an anti-freeze additive such as ethylene glycol. The inverted tube can be fabricated from any of the wide variety of materials possessing the properties of good flexibility, non-porosity, good elastic recovery and low compression set. The material must also be resistant to the particular fluid being employed. It is preferred to operate with water as the fluid in the hydraulic system due to its high fluidity and low thermal expansion. Also, water permits the inverted tube to be made of natural rubber which has optimum characteristics for such inverted tube application.

Another design advantage of the cylinder of my invention is that the fluid trapped between the cup washer and inverted tube fold can be of a different nature than the fluid used to transmit motion since the trapped fluid volume is divided from the transient fluid by the cup washer and is in effect a separate entity. Thus, the trapped fluid can be a highly viscous fluid insoluble in the transient fluid which will not only lubricate the cup washer but also preclude any friction between the walls of the inverted tube if any malfunctioning of the cup washer occurs. Also, the viscous fluid can be used to coat the washer and tube to provide against complete binding of tube walls if malfunctioning of the washer occurs. For example, where the transient fluid is water and ethylene glycol the inner walls of the inverted tube and the cup washer can be heavily coated with castor oil, or as another alternative a silicone grease, either of which are insoluble in the transient fluid and have no adverse reaction on an inverted tube of rubber. Thus, to effect the coating with a viscous fluid the inverted tube and cup washer can be coated prior to assembly and the cup washer can even be impregnated with the viscous fluid. On the other hand, the inverted tube and cup washer can be assembled without coating and then the volume between the cup washer and the fold of the inverted tube can be charged with the viscous fluid thereby effecting the coating. If desired, the charged viscous fluid can be drained from the trapped volume after coating or it can be retained in the trapped volumes as mentioned above and utilized in this manner.

I claim:

1. A hermetically sealed double action hydraulic unit comprising a hollow body having means defining a first chamber within said body at one end thereof and means defining a second larger chamber within said body at the other end thereof in communication with the first smaller chamber, a ram within said body extending in spaced-apart relationship with said first and said second chambers and axially movable within said first and second chambers, the surface of said ram and said first chamber wall defining the peripheral walls of a first clearance space, the surface of said ram and said second chamber wall defining the peripheral walls of a second clearance space, a flexible sealing member attached to the end of said ram and having its periphery normally in sliding, sealing contact with said first chamber wall, and an annular, flexible diaphragm in sealed coaxial attachment at its outer peripheral edge to said hollow body intermediate said first and second chambers and in sealed coaxial attachment at its inner peripheral edge to said ram, and having extending between said edges a single annular fold travelling within said second clearance space, said annular diaphragm permitting axial movement of said ram within said body, said flexible sealing member and said annular diaphragm defining therebetween a first volume and a second volume within said first and second clearance spaces, respectively, said flexible sealing member being movable under hydraulic pressure to admit fluid to said volumes, said flexible sealing member being biased to return to its normal position thereby preventing the removal of fluid from said volumes, said first and said second clearance spaces dimensioned so that when said ram is moved within said hollow body, thereby moving said sealing member and the annular fold of said diaphragm, the rate of change of said first volume is equal to the rate of change of said second volume; whereby the total of said first and second volumes is maintained constant.

2. The apparatus of claim 1 in which the smaller chamber includes means for communicating with an hydraulic system and in which said ram is biased toward the end of the cylinder with the means for communicating with the hydraulic system with a force sufficient to offset the force exerted by the piezometric head of said hydraulic system.

3. A hermetically sealed double action hydraulic unit comprising a hydraulic cylinder with means for communicating with a hydraulic system at one end thereof, a ram within said hydraulic cylinder having a generally cylindrical surface extending in spaced-apart relationship with said cylinder wall and axially movable within said cylinder, said ram travelling axially beyond the end of said cylinder remote from the end of the cylinder with means for communicating with the hydraulic system, the surface of said ram and the wall of said cylinder defining the peripheral walls of a first generally annular clearance space, a flexible, circular sealing member attached to the end of said ram and having its periphery normally in sliding, sealing contact with the wall of said cylinder, an annular, flexible diaphragm in sealed coaxial attachment at its outer peripheral edge to the end of said cylinder remote from the end communicating with the hydraulic system and in sealed coaxial attachment in its inner peripheral edge to said ram intermediate the ends thereof, a hollow cylindrical casing of larger diameter than said hydraulic cylinder positioned coaxially with said hydraulic cylinder and extending from the end of said hydraulic cylinder remote from the end with means for communicating with the hydraulic system, said casing member and the surface of said ram defining the peripheral walls of a second generally annular clearance space, said annular diaphragm having extending between said peripheral edges thereof a single annular fold travelling within said second generally annular clearance space, said annular diaphragm permitting axial movement of said ram within said cylinder and within said casing, said flexible, circular sealing member and said annular diaphragm defining therebetween a first generally annular volume in said first clearance space within said cylinder and a second generally annular volume in said second clearance space within said casing, said flexible circular sealing member being movable under hydraulic pressure to admit fluid to said volumes, said flexible circular sealing member being biased to return to its normal position thereby preventing the removal of fluid from said volumes, said cylinder, said casing and said ram dimensioned in proportion to each other so that when said ram is moved within said cylinder and said casing, thereby moving said circular sealing member and said annular fold of said diaphragm, the rate of change of said first generally annular volume is equal to the rate of change of said second annular volume; whereby the total of said first and said second generally annular volumes is maintained constant.

4. The apparatus of claim 3 in which an operating rod extends coaxially from the end of said ram remote from the end of the cylinder with means for communicating with the hydraulic system and wherein said ram is biased toward this end of the cylinder with a force sufficient to offset the force exerted by the piezometric head of said hydraulic system.

5. The apparatus of claim 3 in which said ram has a cylindrical surface of constant diameter and in which the cross-sectional area of said first volume is equal to one-half the cross-sectional area of said second volume.

6. The apparatus of claim 1 in which the volumes between the flexible sealing member and annular diaphragm are charged with a viscous fluid insoluble in the fluid of a hydraulic system communicating with the smaller chamber.

7. The apparatus of claim 6 in which the viscous fluid is castor oil and the fluid of the hydraulic system comprises water.

8. The apparatus of claim 3 in which the volumes between the flexible sealing member and annular diaphragm are charged with a viscous fluid insoluble in the fluid of a hydraulic system communicating with the smaller chamber.

9. The apparatus of claim 8 in which the viscous fluid is castor oil and the fluid of the hydraulic system comprises water.

References Cited in the file of this patent

UNITED STATES PATENTS

| | | |
|---|---|---|
| 1,085,818 | Oxnard | Feb. 3, 1914 |
| 1,153,214 | Fulton | Sept. 14, 1915 |
| 2,880,620 | Bredtschneider | Apr. 7, 1959 |